Aug. 2, 1960 R. T. PALMER 2,947,467
COMBINED AXIAL AIR GAP MOTOR AND GAS COMPRESSOR
Filed Aug. 1, 1958 3 Sheets-Sheet 1

Inventor:
Robert T. Palmer,

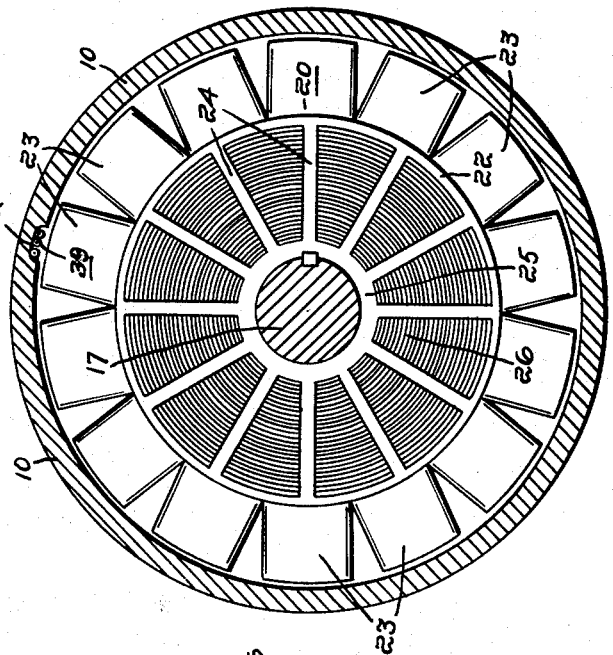
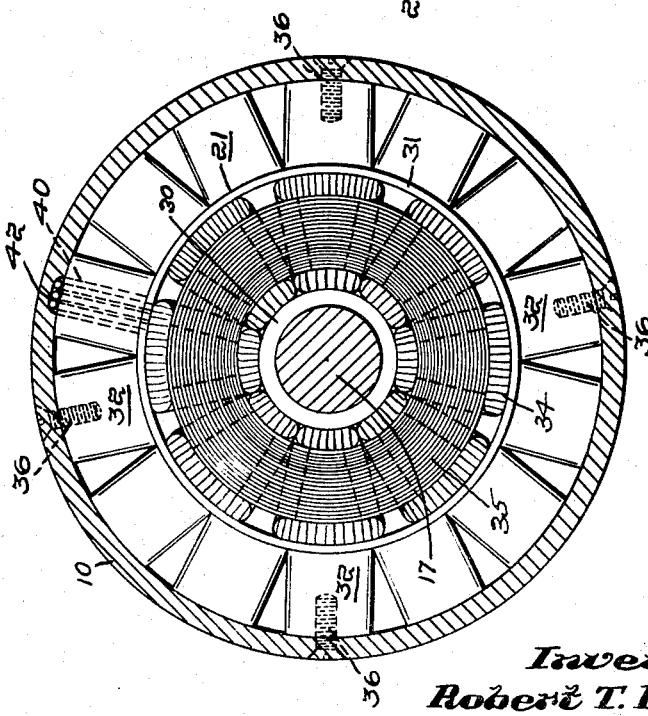

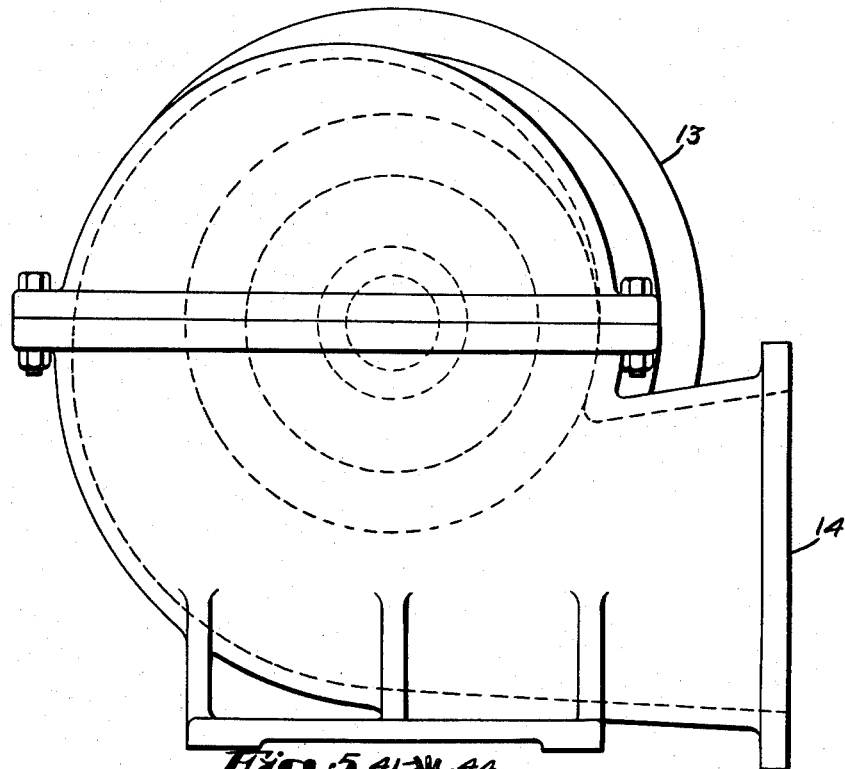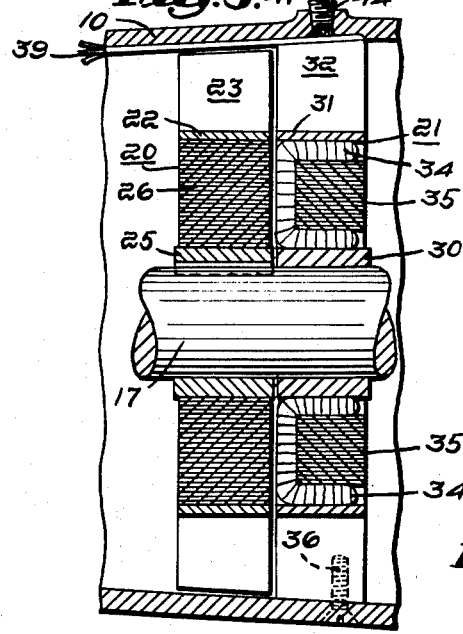

2,947,467
COMBINED AXIAL AIR GAP MOTOR AND GAS COMPRESSOR

Robert T. Palmer, Sharon, Mass., assignor to Westinghouse Electric Corporation, East Pittsburgh, Pa., a corporation of Pennsylvania Filed Aug. 1, 1958, Ser. No. 752,581

3 Claims. (Cl. 230—117)

This invention relates to gas compressors, and relates more particularly to axial-flow refrigerant compressors.

Refrigerant compressors having their electric driving motors hermetically sealed within the compressors and exposed to suction gas flow, are widely used. An example of a hermetically sealed, axial-flow, refrigerant compressor is disclosed in the A. I. Ponomareff Patent No 2,458,730. The casing for such a multi-stage compressor has to be relatively long in order to provide room for the separate motor which drives the rotor of the compressor.

This invention reduces the size of and the cost of an axial-flow compressor by placing the rotor blades of the compressor on the rotors of a multi-rotor, axial air gap, electric motor, and by placing the counter spin vanes of the compressor on the stators of the motor.

An object of this invention is to reduce the cost of axial-flow gas compressors driven by electric motors.

Another object of this invention is to reduce the size of axial-flow gas compressors driven by electric motors.

This invention will now be described with reference to the annexed drawings, of which:

Fig. 2 is a section along the line 2—2 of Fig. 1;

Fig. 3 is a section along the line 3—3 of Fig. 1;

Fig. 4 is an end view of the discharge end of the compressor, and

Fig. 5 is a fragmentary side view, in section, showing a rotor and its associated stator.

Figure 1:
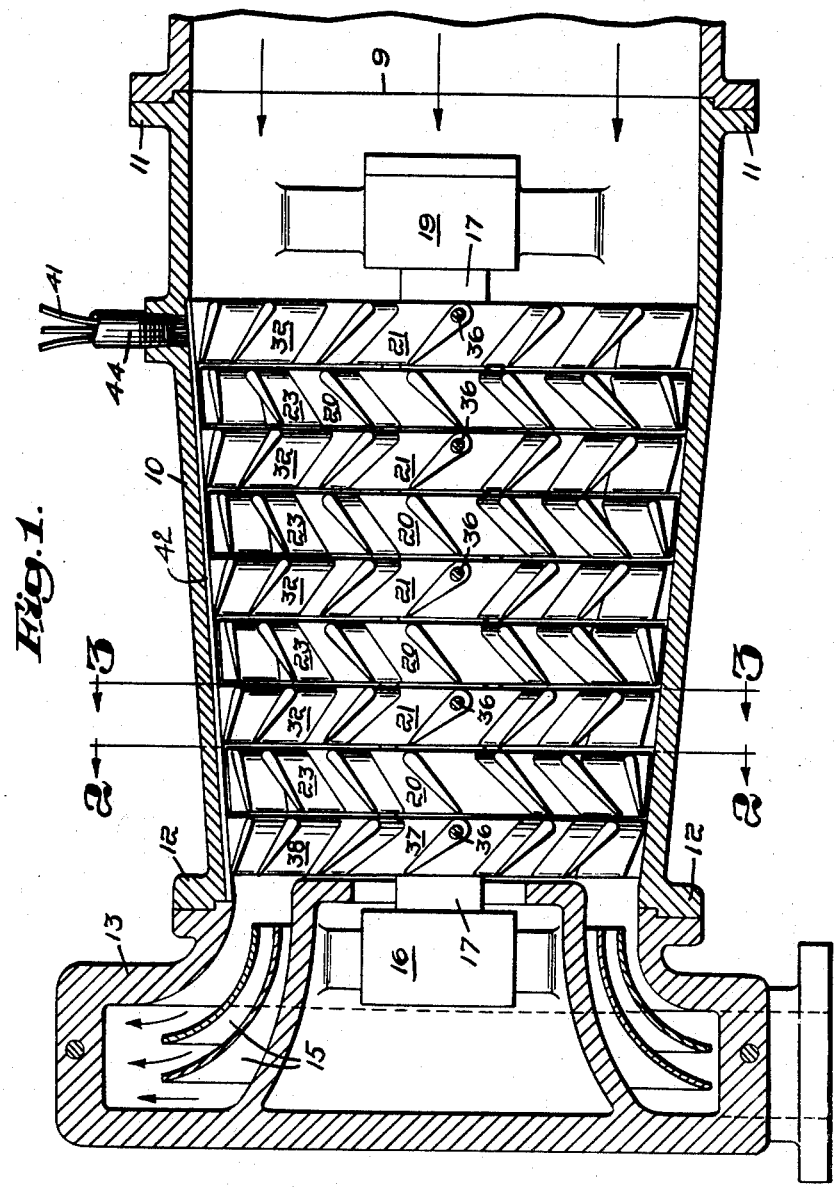
Fig. 1 is a side elevation, partially in section, of a refrigerant compressor embodying this invention.

The compressor has a generally cylindrical shaped casing 10 having at its gas inlet end 9, a flange 11 for connection to a source of gas to be compressed, and having at its outlet end, a flange 12 for connection to a scroll-shaped outlet casing 13. The outlet casing 13 contains a pair of guides 15 for smoothly guiding the compressed gas into tangential outlet 14 of the casing 13. The outlet casing 13 has secured to its inner surface a bearing 16 for one end of rotary shaft 17. The casing 10 has secured to its inner surface adjacent its inlet end 9, a bearing 19 for the other end of the shaft 17.

An axial air gap, electric motor has spaced apart rotors 20 secured to the shaft 17 between the bearings 16 and 19, and has stators 21 alongside the rotors 20, there being a stator 21 for each rotor 20.

The rotors have outer rings 22 formed integrally with inner rings 25 and radial ribs 24. Airfoil blades 23 are formed on the outer surfaces of the rings 22. The inner rings 25 are keyed to the shaft 17. Between the rings 22 and 25 are spirally wound laminations 26 which are slotted to receive the ribs 24.

The stators 21 have inner rings 30 forming bearing surfaces for the shaft 17, and have outer rings 31 on which are formed airfoil-shaped, counter spin vanes 32. Between the rings 30 and 31 are stator coils 34 folded around metal laminations 35 for reducing the diameters of the stators. The stators 21 are secured to the casing 10 by machine screws 36 which extend from the outer surface of the casing into threaded openings in four solid vanes 32.

A downstream ring 37 similar to the stator rings 31, has airfoil-shaped, counter spin vanes 38 formed on its outer surface, four of the vanes 38 being secured to the casing 10 by machine screws 36 for supporting the ring 37 from the casing.

The rotor rings 22, the stator rings 31 and the ring 37 have the same diameter, and are aligned so that the bases of the vanes and blades are in alignment. The radial lengths of the vanes and blades decrease progressively from the inlet to the outlet of the compressor for providing that each stage handle the same mass of gas, the density of the gas increasing as it passes through the compressor.

The stator windings 34 except for being folded, are conventional polyphase windings which are interconnected by conductors 39 which extend through an opening 40 in one vane 32 of each stator, and in a longitudinal slot 42 in the inner surface of the casing aligned with the openings 40. The conductors 39 are connected to corresponding conductors 41 which extend through a bushing 44 threaded into the casing opposite the slot 42, to a source of A.C. power which is not shown.

Each rotor 20 has a stator to its right (facing Fig. 1). The rotors 20 form a multi-stage, axial flow compressor. The rotor blades produce undesired spin in the direction of rotation, and the vanes 32 of the stators 21, and the vanes 38 on the ring 37 are counter-spin vanes. The vanes 32 on the first stator, the stator nearest the bearing 19, are pre-spin vanes, and give the gas passing therebetween a spin opposite to the direction of the rotors. This increases the pressure added to the gas by the rotor next to that stator. The vanes on the other stators and on the ring 37 are for removing the spin imparted to the gas by the preceding rotors. The vanes on the ring 37, and the ring 37, can be omitted when it is desired, taking into account the speed of rotation and other variables, that the gas entering the tangential outlet have some spin.

By combining the compressor and its driving motor in a single unit, the number of parts, the amount of material, the cost, and the size of the assembly are greatly reduced. Since there is no separate motor in the gas inlet passage, there is less turbulence in the gas entering the compressor than in prior hermetically sealed units.

The rotor blades, the stator vanes, and the rings on which the blades and vanes are formed, act also as heat transfer surfaces for transmitting heat from the motor to the gas stream.

Operation

In operation, when the conductors 41 are connected to an A.C. power source, the rotating fields produced by the stator windings cause the rotors to rotate in a direction to cause their blades to compress the gas supplied to the unit, each downstream rotor adding to the pressure of the gas leaving the preceding upstream rotor. The counter spin vanes of the stator furtherest upstream spin the gas in a direction counter to the direction of rotation of the rotors, thereby increasing the pressure added to the gas by the following rotor. The counter spin vanes on the other stators and on the ring 37 remove the spin added to the gas by the preceding rotors.

What is claimed, is:

1. A gas compressor comprising a casing having a gas inlet at one end and a gas outlet at the opposite end, and having an inner surface between said inlet and outlet circular in cross-section, a rotary shaft, means comprising bearings at the ends of said shaft for supporting said shaft for rotation with its axis at the longitudinal axis of said casing, a plurality of spaced-apart, axial air gap, motor rotors around and attached to said shaft between said bearings, said rotors having outer surfaces, circular in cross-section, spaced inwardly of said inner surface of said casing, spaced-apart compressor blades on said outer surfaces of said rotors and closely approaching but spaced from said inner surface of said casing, a plurality of axial air gap, motor stators in the spaces between said rotors, said stators having outer surfaces, circular in cross-section, spaced inwardly of said inner surface of said casing, spaced-apart counter-spin vanes on said outer surfaces of said stators, said stators having central openings through which said shaft passes, stator windings on said stators, and means for supplying A.C. to said windings.

2. A gas compressor as claimed in claim 1 in which means is provided for supporting a plurality of said vanes of each of said stators from said casing, and in which each of said stators has a bearing surface around and in contact with said shaft.

3. A gas compressor comprising a casing having a gas inlet at one end and a gas outlet at the opposite end, and having an inner surface between said inlet and outlet which is circular in cross-section, a rotary shaft, means comprising bearings at the ends of said shaft for supporting said shaft for rotation with its axis at the longitudinal axis of said casing, a plurality of spaced-apart, axial air gap, motor rotors around and attached to said shaft between said bearings, said rotors having outer surfaces, circular in cross-section, spaced inwardly of said inner surface of said casing, spaced-apart compressor blades on said outer surfaces of said rotors and closely approaching but spaced from said inner surface of said casing, a plurality of axial air gap, motor stators in the spaces between said rotors, said stators having outer surfaces, circular in cross-section, spaced inwardly of said inner surface of said casing, spaced-apart counter spin vanes in the spaces between said outer surfaces of said stators and said inner surface of said casing and attached to said inner surface of said casing, said stators having central openings through which said shaft passes, stator windings on said stators, and means for supplying A.C. to said windings.

References Cited in the file of this patent
UNITED STATES PATENTS

| 2,031,688 | Bowen | Feb. 25, 1936 |
| 2,700,343 | Pezzillo | Jan. 25, 1955 |